United States Patent
Bickert

(10) Patent No.: US 6,311,967 B1
(45) Date of Patent: Nov. 6, 2001

(54) MOULDING TOOL FOR THE MANUFACTURE OF PRECISION ARTICLES

(75) Inventor: Stefan Bickert, Überlingen (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/265,757

(22) Filed: Mar. 10, 1999

(30) Foreign Application Priority Data

Mar. 10, 1998 (EP) .................................................. 98104272

(51) Int. Cl.[7] ....................................................... B23Q 3/00
(52) U.S. Cl. ............................ 269/287; 279/1; 29/402.07
(58) Field of Search ..................... 269/287, 43; 279/208, 279/103, 47, 40, 49, 50, 51, 52, 53, 54, 1, 76, 87

(56) References Cited

U.S. PATENT DOCUMENTS

| | | | |
|---|---|---|---|
| 2,817,535 | * 12/1957 | Linzell | ............................... 29/402.07 |
| 3,582,157 | 6/1971 | Hammond . | |
| 3,871,803 | 3/1975 | Beattie . | |
| 4,214,766 | * 7/1980 | Rall et al. | ........................... 279/46 R |
| 4,251,084 | * 2/1981 | Franklin | ................................... 279/1 |
| 4,309,041 | * 1/1982 | Peterson | ................................. 279/1 |
| 4,402,659 | 9/1983 | Greenbaum . | |
| 4,867,463 | * 9/1989 | Hopf | ...................................... 279/41 |
| 5,267,384 | * 12/1993 | Teeslink | ............................. 29/402.07 |

FOREIGN PATENT DOCUMENTS

| | | |
|---|---|---|
| 3630 001 A1 | 4/1987 | (DE) . |
| 40 20 354 A1 | 1/1992 | (DE) . |
| 196 10 563 A1 | 9/1997 | (DE) . |
| 0 686 491 A2 | 12/1995 | (EP) . |
| 0 806 286 A2 | 6/1997 | (EP) . |

\* cited by examiner

Primary Examiner—Joseph J. Hail, III
Assistant Examiner—Daniel Shanley
(74) Attorney, Agent, or Firm—R. Scott Meece; Robert J. Gorman, Jr.

(57) ABSTRACT

The invention relates to a process for the production of a clamping means for clamping a component (20) in a holder (16), especially for the production of moulding tools for the manufacture of precision articles. Spring-action clamping elements (72), for example tightening discs or clamping sleeves (72), are inserted into a recess of the holder (16) and final working thereof takes place in a position that corresponds to the subsequent position when the component (20) to be clamped is clamped. With this process, very good centricity and coaxiality of the clamped components (20) is achieved, whereby the manufacturing tolerances to be maintained for the individual components are not critical.

6 Claims, 3 Drawing Sheets

Figure 1:
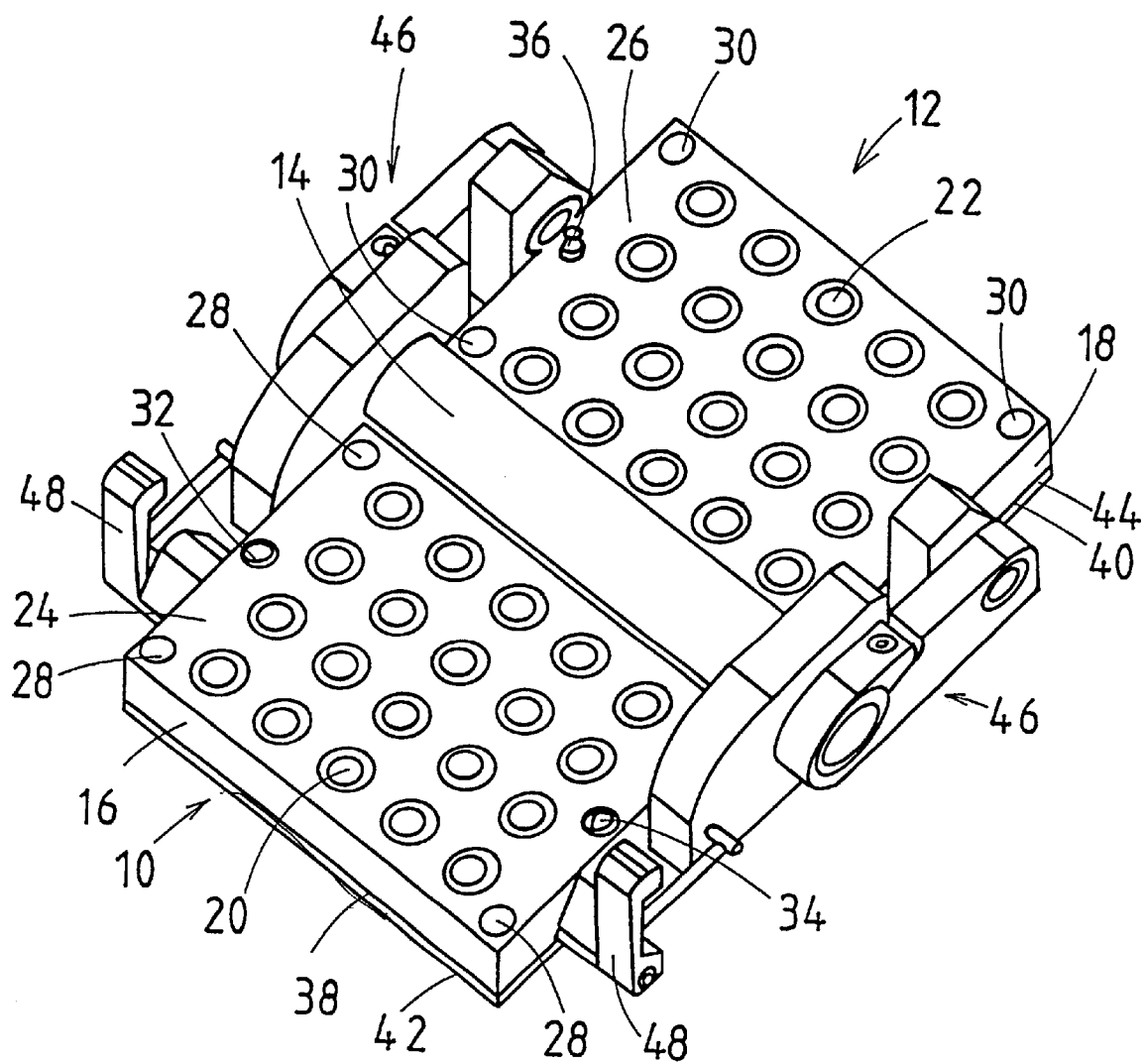

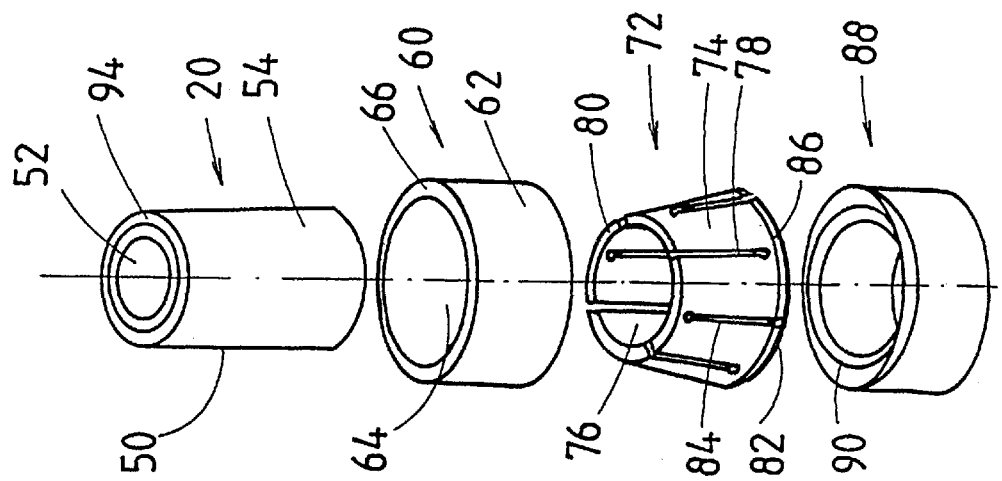
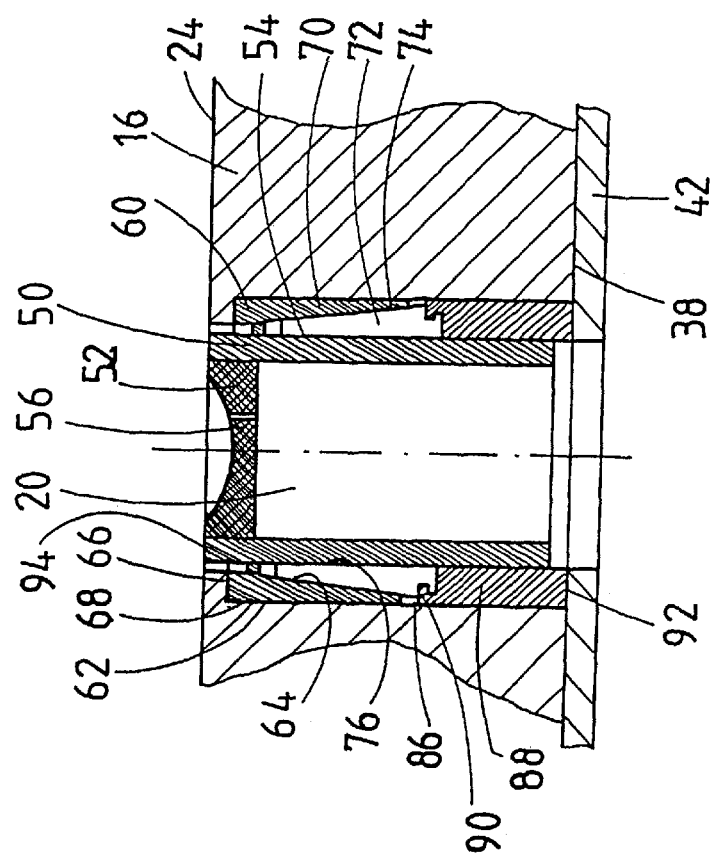
Fig. 3
Fig. 2

MOULDING TOOL FOR THE MANUFACTURE OF PRECISION ARTICLES

The invention relates to a process for the production of a clamping means for clamping a component having contact surfaces in a holder, especially for clamping moulding tool inserts in a support plate in order to produce a moulding tool for the manufacture of precision articles, for example contact lenses.

The invention further relates to a clamping means for clamping a component having contact surfaces in a holder, especially for clamping moulding tool inserts in a support plate in order to produce a moulding tool for the manufacture of precision articles, for example contact lenses.

With moulding tools used to manufacture precision articles, it is very important that the tool inserts are held in a releasable manner in the support plate in precisely defined and reproducible positions. Clamping means are used for this purpose. However, such clamping means may also be employed for example for the positioning and clamping of workpieces, for example during the clamping operation, in which high clamping precision of the workpiece is similarly required.

The invention further relates to a process for producing a moulding tool for the manufacture of precision articles, especially contact lenses, whereby the moulding tool has
- two tool halves, each half containing a tool holder into each of which is clamped one tool insert of at least one pair of shape-determining tool fingers having contact surfaces, and
- positioning means, by means of which the tool holders when the moulding tool is closed are positioned relative to one another in such a way that each of a pair of shape-determining tool inserts is opposite the other and interacts with the other to form a mould cavity.

The invention also relates to a moulding tool for the manufacture of precision articles, especially contact lenses, containing
- (a) two tool halves, each half containing a tool holder into each of which is clamped one tool insert of at least one pair of shape-determining tool inserts having contact surfaces, and
- (b) positioning means, by means of which the tool holders when the moulding tool is closed are positioned relative to one another in such a way that each of a pair of shape-determining tool inserts is opposite the other and interacts with the other to form a mould cavity Moulding tools of this kind for the manufacture of contact lenses require very high precision of concentricity between two opposed tool inserts, whereby the eccentricity of the closed moulding tool may not be greater than ±5 $\mu$m. This in turn leads to very high precision requirements of the clamping means used. In addition, the clamping power of the clamping means must be sufficient for an axial force of >500 N to be capable of being exerted on the tool insert without any shift of the clamped tool insert in an axial direction.

Commercial clamping means for tool machines, in which a workpiece is positioned and clamped, only fulfill the precision requirement of <±5 $\mu$m to a limited extent in their standard programme.

Moulding tools for the manufacture of contact lenses are known. They consist of two halves of a mould, in which several pairs of opposed moulding tool inserts are arranged in two support plates. The tool inserts of the two mould halves are in alignment with one another and when the mould is closed they form a mould cavity between them. In known moulding tools for the manufacture of contact lenses, the support plates are made of aluminum. The moulding tool inserts are clamped in the support plates by clamping means. To serve this purpose, a thin-walled, cylindrical clamping bush is inserted in a bore of the support plate and is fastened to the support plate by a flange. A sleeve-shaped holder for the tool insert is seated in the clamping bush. The clamping bush forms a pocket, into which pressure means (clamping oil) can be introduced. As a result, the wall of the clamping bush is deformed and the holder is clamped in place. A centering pin serves to position the clamping bush initially. The support plates may hold several tool inserts, which form several mould cavities for simultaneous manufacture of several contact lenses or the like, in the manner described. With this known moulding tool, a centering precision and a concentricity of the clamped tool inserts of ±5 $\mu$m is achieved.

These known moulding tools each require a large number of high-precision components. All the components require complicated surface treatment. The registration of the tool inserts opposed to one other in the two mould halves is difficult and time-consuming and hence expensive. Tolerances of the components are cumulative, so that precision in the known moulding tools is limited. For this reason, great care must be taken when handling the moulding tools. Furthermore, the hydraulic clamping means takes up a lot of room, so that only a relatively small number of tool inserts can be accommodated in a given support plate of the dimensions concerned.

Furthermore, with these known moulding tools, process steps involving the use of heat are not permitted. The linear expansion of the components is variable. As a result, when there are temperature changes, both the alignment and the clamping power are greatly affected. The oil pressure of the hydraulic clamping system also alters under the action of heat.

A problem arises when the mould is opened. Then, the moulded precision articles may be retained by either one or the other of the mould halves. This depends on random influences that are difficult to control. This uncertainty makes it difficult to remove the precision articles, especially if this is to be carried out automatically by a machine.

A moulding tool for the manufacture of precision articles, especially contact lenses, is known from DE 196 10 563 A1. This is intended to eliminate the above-described disadvantages. As with the above-described moulding tool, the moulding tool consists of two mould halves, in which several pairs of opposed shape-determining moulding tool inserts are arranged in bores in two support plates. No clamping means are used to clamp the tool inserts in the support plates, but the tool inserts are held in the bores of the support plates by optical wringing. The tool inserts of the two mould halves align with one another and when the mould is closed form a hollow cavity between them. Both the tool inserts and the support plates consist of a material which has negligible thermal expansion at the operational temperature range of the moulding tool. This material may be a glass ceramics material, or a specific metal alloy such as invar or quartz glass. In this way, the geometry of the bores of the support plates, which serve to receive the moulding tool inserts, does not change in dependence on temperature, so that the tool inserts maintain their positions relative to the support plates even during temperature changes.

A disadvantage of this moulding tool described in DE 196 10 563 A1 is the complex production process. The conventional tool inserts used in the above-described moulding tool cannot be used here. New tool inserts have to be produced, whereby the contact surfaces have to be worked very precisely, so that optical wringing is possible. Since the connection between the tool inserts and the support plates is effected by optical wringing, release of the tool inserts is complex.

The invention is based on the problem of providing a clamping means to clamp a component in a holder, which is of simple construction, and by means of which the component to be clamped can be clamped in the holder with high precision.

The invention is based especially on the problem of providing a moulding tool for the manufacture of precision articles, particularly contact lenses, in which tool inserts can be clamped in tool holders in a simple manner with high precision.

This problem is solved according to the invention by a process for the production of a clamping means according to claim 1 or a process for the production of a moulding tool according to claim 2.

This problem is also solved according to the invention by a clamping means according to claim 6 or a moulding tool according to claim 7.

The recess or recesses in the holder may be blind-end bores or continuous bores with cylindrical walls. In this case, the first contact surfaces of the clamping means may consist of an annular or cylindrical superficies.

The contact surfaces of the component or tool insert to be clamped may consist of a cylindrical superficies. In the case of a moulding tool for the manufacture of contact lenses according to the invention, the tool inserts to be clamped a preferably identical to he tool inserts that are used in the above-mentioned known moulding tool for the manufacture of contact lenses, so that it is not necessary to produce new types of tool inserts. The second contact surfaces of the clamping means in this case may be annular or cylindrical and may be provided directly at the spring-action clamping elements.

The recess or recesses in the holder may be graduated bores forming a ring shoulder. The spring-action clamping elements may be formed by one or more tightening discs having annular contact surfaces which in the clamped state of the component to be clamped adjoin a cylindrical superficies of the component to be clamped. A first tightening disc may adjoin the ring shoulder of the bore. In order to obtain a precisely defined position of this tightening disc, however, it is advantageous to provide a contact disc between the ring shoulder and this tightening disc, this contact disc forming a sharp edge with the wall of the bore. Any further tightening discs that may be provided can be arranged directly next to this first tightening disc. The tightening discs are operated mechanically. This can be effected by an actuating component in the form of an actuating sleeve, through which pressure is applied to the tightening discs, so that the tightening diameter of the tightening disc or discs is reduced.

Several tightening discs may also be provided at several levels of the recess, and are separated from one another by washers. In this way, the component to be clamped is clamped at several levels, thus preventing the clamped component from tilting in the holder.

However, the spring-action clamping elements may also be formed by one or more clamping sleeves having cylindrical contact surfaces, which in the clamped position of the component to be clamped make contact with a cylindrical superficies of the component to be clamped. To achieve the springing action of the spring-action clamping sleeve, the wall of the clamping sleeve may be provided with slots which permit the clamping diameter of the clamping sleeve to be changed. The clamping sleeve may have a conical outer face. A centering sleeve provided with a conical inner face designed to be complementary thereto may adjoin a ring shoulder of the bore. The clamping sleeve is operated mechanically, slipping into the centering sleeve, whereby the conical outer face of the clamping sleeve interacts with the conical inner face of the centering sleeve, so that the clamping sleeve is compressed around the component to be clamped, thereby firmly clamping it. This may be effected by an actuating component in the form of an actuating sleeve, whereby the actuating sleeve may be joined to the clamping sleeve. Since the clamping sleeve adjoins the component to be clamped with a relatively large contact area, the component to be clamped is also prevented from tilting when using a single clamping sleeve. In addition, good cohesion can be achieved, and the contact pressure at the tool insert is minimised.

To produce the clamping means according to the invention or the moulding tool according to the invention, firstly all the components are produced individually by customary manufacturing processes, maintaining the usual manufacturing tolerances of precision manufacturing, for example in the range of ±0.05 mm or even greater. If the components thus produced were to be constructed together for use as a clamping means or moulding tool without undertaking the working according to the invention of the second contact surfaces of the clamping means, there would be unacceptably large inaccuracies in centering or coaxiality of the parts or tool inserts to be clamped, since the tolerances of the individual components are cumulative. Production of the components whilst maintaining manufacturing tolerances, leading to satisfactory precision in the assembled state, is not possible from an economic point of view when using conventional manufacturing techniques.

The invention is based on the knowledge that tolerances of the individual components play a secondary role. The decisive factor is merely the tolerances occurring in the clamped state of the part or tool insert to be clamped between the contact surfaces of the clamping means and the contact surfaces of the part or tool insert to be clamped. In order to keep these tolerances low, the components produced by customary manufacturing processes are then assembled, so that the clamping means or the spring-action clamping elements are pre-tensioned to a specific degree, whereby the part or tool insert to be clamped is not yet used. The specified initial tension of the clamping elements is chosen so that the second contact surfaces of the clamping means are approximately in the position in which they later adjoin the contact surfaces of the part or tool insert to be clamped. In this position, the second contact surfaces are then prepared, for example by grinding.

To maintain this defined initial tension of the clamping means, a washer can be provided. The washer may be used in such a way that it serves as a stop for an actuating component to actuate the clamping elements. The washer is of a dimension such that the clamping elements are under the desired, defined initial tension when the actuating component adjoins the washer. In the moulding tool according to the invention, the tool holders preferably consist of support platen, whereby the recesses that receive the tool inseams extend through the support plate, so that it is possible to access the inserted clamping means from both sides of the support plate. The second contact surfaces of the clamping means can then be finished when the moulding tool is closed, the second contact surfaces of the clamping means inserted in each of the two aligned recesses preferably being finished together. This can take place by grinding through two recesses in one grinding process. A high concentricity between the second contact surface of the clamping means of two opposed recesses is thereby achieved.

A moulding tool according to the invention may contain an actuating component, through which the spring-action clamping element(s) of all clamping means associated with a tool holder are actuated simultaneously. This actuating component may be a plate, through which parts of the clamping means are pushed into the recesses when the plate is pressed against the tool holder. If the plate is then located in a defined layout on the tool holder and is secured there, these parts of the clamping means are located in precisely defined positions. This ensures that the clamping means are clamped in the same way in all recesses of the tool holder, so that the clamping power is equal.

In the clamping means according to the invention and the moulding tool according to the invention, the positioning precision of the component or tool insert to be clamped is only dependent on the manufacturing precision of the second contact surfaces of the clamping means, and not on the precision of the apparatus or registration thereof. This means that adjustment, which is generally very difficult and time-consuming, can be dispensed with.

The moulding tool according to the invention may be of very robust construction. There are no hydraulic clamping means. Handling of the moulding tools is thus simplified.

Through the simple and robust construction of the moulding tool according to the invention, the maintenance and cleaning operations are reduced, assembly of the equipment is simplified, the weight of the moulding tool and the tool costs are reduced, and a non-sensitive and safely-functioning moulding tool is created. In addition, thermal process steps can be carried out, and it is possible to clean the moulding tool with tempered water.

It has been shown that with a moulding tool according to the invention, both the centering precision and the concentricity of the clamped tool inserts and also the reproducibility of clamping are improved, whereby centering precision and concentricity of better than ±2.5 µm can be attained. In addition, there is less disalignment of the clamped tool inserts upon repeated opening and closing of the moulding tool.

The clamping means according to the invention can be produced with substantially smaller dimensions than the hydraulic clamping means of the prior art. Thus, the tool inserts arranged in proximity in a tool holder can be considerably closer to each other, whereupon the number of tool inserts in a support plate of a specific dimension and thus the output of precision articles can be increased considerably.

Embodiments of the invention are illustrated more fully in the following by referring to the enclosed drawings.

FIG. 1 is a schematic representation and shows an embodiment of a moulding tool for the manufacture of contact lenses.

Figure 4:
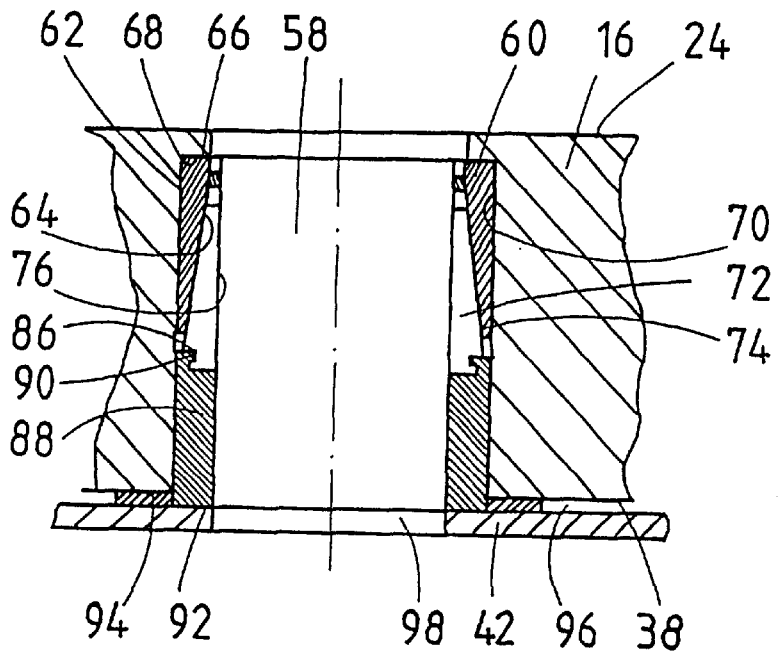
Figure 5:
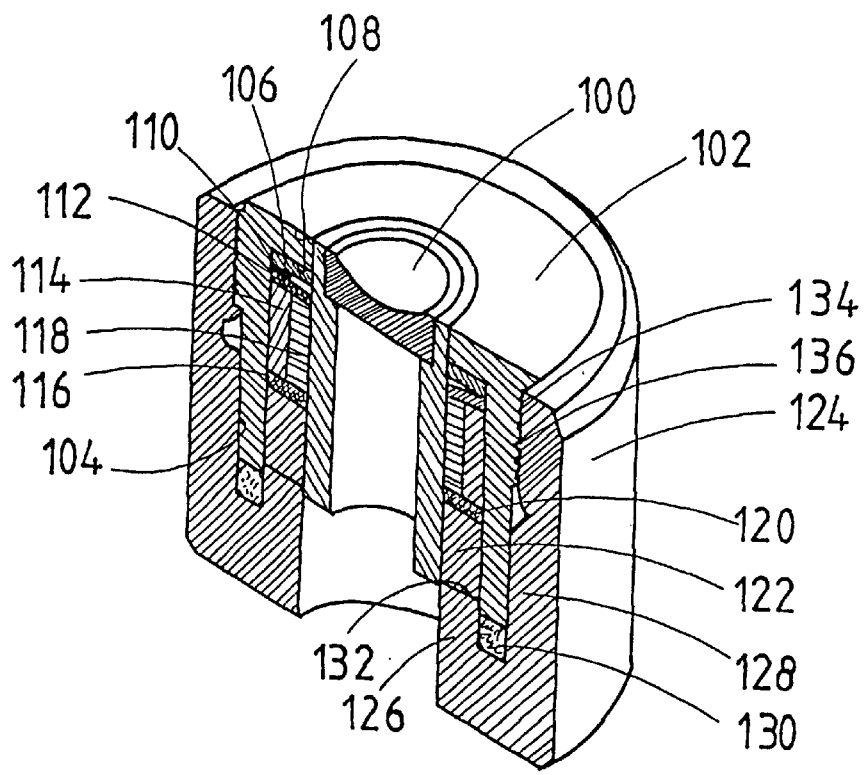

FIG. 2 is a reduced sectional representation and shows a first embodiment of a clamping means with a clamped tool insert, FIG. 3 is a perspective explosive representation and shows the tool insert to be clamped, as well as parts of the clamping means of FIG. 2, FIG. 4 is a reduced sectional representation similar to FIG. 2 and shows the clamping means of FIG. 2 in a position in which the clamping means are pre-clamped in a defined manner to prepare the contact surfaces, FIG. 5 is a perspective sectional representation and shows a second embodiment of a clamping means with a clamped tool insert.

FIG. 1 shows a first tool half denoted by the reference numeral 10 and a second tool half denoted by the reference numeral 12 of a 20-compartment moulding tool for the manufacture of contact lenses. The two tool halves 10 and 12 are joined together by a tool hinge 14. The first tool half 10 contains a first support plate 16. The second tool half 12 contains a second support plate 18. In each of the support plates 16 and 18, there are twenty tool inserts, only one of which is denoted in each half by reference numerals 20 and 22 in order to have a better overview. On the upper Rides 24 and 26 of the support plates 16 and 18, which face one another when the moulding tool is closed, four contact surfaces 28 and 30 are provided, only three of which are visible in FIG. 1. On the upper side 24 of the first support plate 16, there are two index bushes 32 and 34, On the upper side 26 of the second support plate 18, there are two index bolts 36, of which only the index bolt 36 facing index bush 32 is visible in FIG. 1. On each of the lower sides 38 and 40 of the support plates 16 and 18 facing away from the upper sides 24 and 26, an actuating plate 42 and 44 is attached, which will be described more fully below.

In FIG. 1, the moulding tool is shown in the open position. The moulding tool is closed by pivoting the second tool half 12 about the tool hinge 14 by 180°, so that the contact surfaces 30 of the support plate 18 connects onto the contact surfaces 28 of the support plate 16. The tool half 12 is pivoted by using a guide means 46, which is known per se and is not described in more detail here. The two tool halves 10 and 12 are held together firmly by means of stop levers 48.

When the moulding tool is closed, each of the twenty tool inserts 20 of the first tool half 10 lies exactly opposite each of the twenty tool inserts 22 of the second tool half 12. The interaction of the index bolts 36 and the index bushes 32 ensures that the support plates 16 and 18 are aligned with one another precisely.

The tool inserts 20 and 22 are held in recesses of the support plates 16 and 18 by clamping means.

A first embodiment of such a clamping means will how be described with the assistance of FIGS. 2 to 4 and one of the tool insets 20 of the first tool half 10. Corresponding parts in FIGS. 2 to 4 are given the same reference numerals as in FIG. 1.

The tool insert 20 has a holder 50, in which a shape-determining portion 52 is secured. The outer face 54 of the holder 50 is cylindrical. The tool inserts 22 of the second tool half 12 only cs differ from the tool insets 20 of the first tool half 10 in the shape of the shape-determining portion 52, so that the clamping means used there can be designed to conform with the clamping means of the first tool half. In the depicted moulding tool for the manufacture of contact lenses, the shape-determining portion 52 of the tool insert 20 has a concave shaping surface 56 ("w-mould"). The (not shown) shape-determining portion of the tool insert 22 has a convex shaping surface ("m-mould"). When the moulding tool is closed, the two shaping surfaces of the shape-determining portion of two opposed tool insects 20 and 22 form a hollow cavity, the shape of which corresponds to the shape of the precision article to be produced (contact lens). Such tool inserts for the manufacture of contact lenses are known per se and are also used in the moulding tools described initially, which have hydraulic clamping means.

As can be seen best from FIG. 4, a recess is provided in the support plate 16, which is in the form of a continuous, graduated bore 58. A centering sleeve 60 is provided in this bore 58. The centering sleeve 60 is of basically cylindrical shape with a cylindrical outer face 62 and a conical inner face 64 which tapers upwards in FIGS. 2, 3 and 4. When it is being used, the centering sleeve 60 with an annular end face 66 adjoins an annular projection 68 of the bore 58 and with the cylindrical outer fate 62 adjoins the cylindrical wall 70 of the bore 58.

A spring-action clamping sleeve 72 is inserted from below into the centering sleeve 60 in FIG. 2. The clamping sleeve 72 has a basically cylindrical shape with a conical outer face 74 corresponding to the inner face 64 of the centering sleeve 60 and a cylindrical inner face 76. In the wall of the clamping sleeve 72, there are a plurality of continuous first slots 78, which are open at the upper end face 80 of the clamping sleeve 72 in FIG. 3 and extend to just before the lower and fat 82 of the clamping sleeve 72 in FIG. 3. In the embodiment of the clamping sleeve 72 illustrated in FIG. 3, four such slots 78 are provided. These run vertically and are evenly distributed on the periphery of the clamping sleeve 72. In the wall of the clamping sleeve 72, there are additionally a plurality of continuous second slots 84, which are open at the lower end face 82 of the clamping sleeve 72 in FIG. 3 and extend to just before the upper end face 80 of the clamping sleeve 72 in FIG. 3. In the embodiment of the clamping sleeve 72 illustrated in FIG. 3, four such slots 84 are provided, These run vertically and are evenly distributed on the periphery of the clamping sleeve 72 and each extends precisely between two of the first slots 78. This design of the clamping sleeve 72 ensures that the clamping sleeve 72 has spring-action in a radial direction, so that the internal diameter of the clamping sleeve 72 can be altered.

In the vicinity of the lower end face 82 in FIGS. 2, 3 and 4, the outer face 74 of the clamping sleeve 72 has an annular T-slot 86. A cylindrical actuating sleeve 88 engages this annular T-slot 86 with its annular collar 90. The external and internal diameters of the actuating sleeve 88 are chosen such that the actuating sleeve 88 can be moved in the gap between the wall 70 of the bore 58 and the cylindrical outer face 54 of the holder 50 of the tool insert 20.

The tool insert 20 is clamped in the support plate 16 in the following manner:

First of all, the centering sleeve 60 is inserted from below in FIG. 2 into the bore 58, so that the annular end face 66 of the centering sleeve 60 makes contact with the annular projection 68 of the bore 58 and the centering sleeve 60 is clamped firmly in the bore 58 and is thus securely connected to the support plate 16. The actuating sleeve 88 engages with its annular collar 90 in the annular T-slot 86 of the clamping sleeve 72, and is thus joined to the clamping sleeve 72. Then, the clamping sleeve 72 with the actuating sleeve 88 is pushed from below in FIG. 2 into the bore 58 of the support plate. The conical outer face 74 of the clamping sleeve 72 thereby makes contact with the conical inner face 64 of the centering sleeve 60. The lower end of the actuating sleeve 88 in FIG. 4 projects somewhat from the lower side 38 of the support plate 16. Then, the tool insert 20 is pushed (upwards or downwards in FIG. 2) into the actuating sleeve 88 and into the clamping sleeve 72, whereby the inner face 76 of the clamping sleeve 72 comes into contact with the outer face 54 of the holder 50 of the tool insert 20. The actuating plate 42 is placed against the lower end face 92 of the actuating sleeve 88 in FIG. 2, pressed against the lower side 38 of the support plate 16 and secured to it, for example screwed on. The clamping sleeve 72 it thereby pushed upwards in FIG. 2. Through the interaction between the conical inner face 64 of the centering sleeve 60 and the conical outer face 74 of the clamping sleeve 72, the clamping sleeve 72 is compressed around the holder 50 of the tool insert 20, so that the tool insert 20 is firmly clamped. Care must be taken here that the tool insert 20 is clamped in the desired axial position. In FIG. 2, it can be seen that the upper end face 94 of the holder 50 of the tool insert 20 is snugly sealed with the upper side 24 of the support plate 16. The clamping power acting on the tool insert 20 through the spring-action of the clamping sleeve 72 depends on how far the clamping sleeve 72 is pushed into the centering ring 60. The desired aforementioned clamping power can be obtained by suitably dimensioning the centering sleeve 60, the clamping sleeve 72 and the actuating sleeve 88.

The tool insert 20 is released from the support plate 16 in a simple manner, whereby the actuating plate 42 is released from the support plate 16, the clamping sleeve 72 is moved down a little in FIG. 2, and the tool insert 20 is pressed out (downwards or upwards in FIG. 4) of the bore 58 of the support plate 16. If desired, the clamping sleeve 72 and the actuating sleeve 88 can similarly be removed from the bore 68 of the support plate 16.

An embodiment of a manufacturing process of the first embodiment of clamping means shown in FIGS. 2 and 3 will now be described with reference to FIG. 4. The graduated bore 58 of the support plate 16, the centering sleeve 60, the clamping sleeve 72 and the actuating sleeve 88 are produced by conventional manufacturing processes, whilst maintaining the usual tolerances of precision manufacture in a range of ±0.05 mm. Then, the centering sleeve 60 in the bore 58 of the support plate 16 is brought to its end position shown in FIGS. 2 and 4, where it is securely fixed to the support plate 16. The clamping sleeve 72 is connected to the actuating sleeve 88 and is pushed together with the actuating sleeve 88 into the bore 58 of the support plate 16, until the conical outer face 74 of the clamping sleeve 72 makes contact with the conical inner face 64 of the centering sleeve 60. In this position, the lower end of the actuating sleeve 88 in FIG. 4 projects a little from the lower side 38 of the support plate 16. Before the actuating plate 42 is preeged against the lower end face 82 of the actuating sleeve 88 and is joined to the carrier plate 16, a washer 94 is placed between the actuating plate 42 and the support plate 16 around the lower end of the actuating sleeve 88 projecting from the lower side 38 of the support plate 16 in FIG. 4. Now, when the actuating plate 42 is joined to the support plate 16, a oar 96 is obtained between the support plate 16 and the actuating plate 42, the width of which corresponds to the thickness of the washer 94. In this way, the clamping sleeve 72 and the actuating sleeve 88 are only pushed into the bore 58 of the support plate 16 to such an extent that the lower end of the actuating sleeve 88 projects from the lower side 38 of the support plate 16 by the thickness of the washer 94 in FIG. 4. The thickness of the washer 94 is such that the clamping sleeve 72 is then pushed into the centering ring 60 to such an extent that it is pretension according to subsequent usage, so that the inner face 76 of the clamping sleeve 72 assumes approximately the same position as when the tool insert 20 is clamped. In this position, final working of the clamping sleeve 72 takes plaque, whereby the inner face 76 of the clamping sleeve 72 is polished, so that the shape of the inner face 76 of the clamping sleeve 72 thereby achieved and the clamping diameter of the clamping sleeve 72 thereby achieved corresponds with high precision to the shape and external diameter of the holder 50 of the tool insert 20. Subsequently, the actuating plate 42 is released from the support plate 16, the washer 94 is removed, the clamping sleeve 72 and the actuating sleeve 60 are removed from the bore 58 of the support plate 16 and each individual component is cleaned. It has been shown that using the clamping means thus produced, the tool insert 20 can be clamped in the bore 58 of the support plate 16 with very high precision and reproducibility.

In order to attain good concentricity between two opposed tool inserts 20 and 22 (FIG. 1) when the moulding tool is closed, in an advantageous embodiment, the above-described final working of the clamping sleeve 72 and the corresponding clamping sleeve associated with the tool insert 22 takes place when the moulding tool is closed. The clamping sleeve 72 is inserted into the bore 58 of the first support plate 16 in the position shown in FIG. 4. The clamping sleeve associated with the tool insert 22 is inserted into a corresponding bore of the second support plate 18 in a corresponding manner and position. Thus, the actuating plates 42 and 44 are provided with openings 98 (FIG. 4), the diameter of which corresponds to the internal diameter of the actuating sleeve 88. Then the moulding tool is closed. Owing to manufacturing tolerances of the individual components, the inner faces of the two opposed clamping sleeves are generally not precisely aligned with one another. The above-described final working of the two clamping sleeves now takes place in one operation. To this end, a polishing tool is introduced through the opening 98 and drawn through the two support plates 42 and 44 in one polishing operation. This ensures that the inner faces of the two clamping sleeves are in very precise alignment with one another. If, as in the moulding tool shown in FIG. 1, the support plates 16 and 18 are provided with several pairs of opposed tool inserts 20 and 22, it is of course advantageous if, first of all, all clamping means associated with the individual tool inserts 20 and 22 are inserted corresponding to FIG. 4, before the actuating plates 42 and 44 are joined to the support plates 16 and 18 in the position shown in FIG. 4, and the final working of the clamping sleeves takes place.

FIG. 5 illustrates a second embodiment of a clamping means, by means of which a tool insert 100 is clamped in a generally cylindrical tool holder 102 of a single moulding tool. The tool insert 100 illustrated in FIG. 5 may be identical to the tool insert 20 shown in FIGS. 2 and 3. As with the moulding tool illustrated in FIG. 1, in this moulding tool there is also a second tool holder (not shown in the figures), into which a tool insert corresponding to tool insert 22 (FIG. 1) is clamped. This moulding tool is closed by appropriate means which are not illustrated in the figures. For example, the two tool holders may be screwed onto one another, whereby the two tool holders can be precisely aligned with one other in a similar manner to the moulding tool illustrated in FIG. 1. When the moulding tool is closed, the two tool inserts are precisely opposite one another.

In the tool holder 102, there is a recess in the form of a continuous, graduated bore 104. An annular contact disc 106 is provided in this bore 104. The contact disc 106 adjoins an annular projection 108 of the bore 104 and the cylindrical wall of the bore 104 and is clamped firmly in this position. At the transition between the lower end face of the contact disc 106 in FIG. 5 and the wall of the bore 104, an annular, sharp edge 110 is produced.

Three tightening discs 112 are inserted from below into the bore 104 of the tool holder 102 in FIG. 5. The tightening discs 112 used here are commercial standard parts with typical manufacturing tolerances of ±10 μm (e.g. from the company Ringspann, Bad Homburg). The three tightening discs 112 adjoin the wall of the bore 104, whereby the uppermost of the three tightening discs 112 adjoins the annular sharp edge 110, whereupon the tightening discs 112 assume a precisely defined position.

The upper end face of a cylindrical spacer sleeve 114 adjoins the lower end face of the tightening dites 112 in FIG. 5, and its outer face adjoins the wall of the bore 104. At the transition between the lower end face of the spacer sleeve 114 in FIG. 5 and the wall of the bore 104, again an annular sharp edge 116 is produced. The internal diameter of the spacer sleeve 114 is less than the internal diameter of the tightening discs 112. The upper end face of a cylindrical first power transmission sleeve 118 adjoins the lower end face of the tightening discs 112 in FIG. 5, while its outer face is movable along the inner face of the spacer sleeve 114.

A fourth tightening disc 120, which is shaped in accordance with the tightening discs 112, is connected to the spacer sleeve 114 and the first power transmission sleeve 118. The tightening disc 120 adjoins the lower end face of the first power transmission sleeve 118 in FIG. 5, the wall of the bore 104 and the annular, sharp edge 116, whereupon the tightening disc 120 assumes a precisely defined position.

A second power transmission sleeve 122 is connected to the fourth tightening disc 120 and its upper end face adjoins the fourth tightening disc 120, while its outer face is movable along the wall of the bore 104.

124 indicates a generally cylindrical actuating sleeve, which has a shorter inner and a longer outer cylinder part 126 and 128 that are connected together. Between the inner and outer cylindrical parts 126 and 128, there is an annular T-slot 130. The depth of this annular T-slot 130 is chosen such that in the clamped position of the tool insert 100 shown in FIG. 5, an annular cavity is obtained between the base of the annular T-slot 130 and the lower end face of the tool holder 102. The end face 132 of the inner cylinder part 126 adjoins the lower end face of the power transmission sleeve 122 in FIG. 5. In the upper area of the actuating sleeve 124 in FIG. 5, the outer cylinder part 128 has an internal thread 134 which interacts with an external thread 136 of the tool holder 102.

The tool insert 100 is clamped into the tool holder 102 in the following way:

First of all, the contact disc 106 is inserted from below in FIG. 5 into the bore 104, so that the upper end face of the contact disc 106 makes contact with the annular projection 108 of the bore 104 and the contact disc 106 is firmly clamped in the bore 104 and is thus firmly connected to the tool holder 102. The three tightening discs 112, the first power transmission sleeve 118, the spacer sleeve 114, the fourth contact disc 120 and the second power transmission sleeve 122 are then pushed from below in FIG. 5 into the bore 104 of the tool holder 102. The uppermost of the three tightening discs 112 thereby contacts the sharp edge 110 and the fourth tightening disc 120 contacts the sharp edge 116. The spacer sleeve 114 holds the fourth tightening disc 120 at a certain distance from the three tightening discs 112. Then, the tool insert 110 is inserted (upwards or downwards in FIG. 5) into the bore 104 of the tool holder 102, whereby the inner faces of the tightening discs 112 and 120 make contact with the outer face of the holder of the tool insert 100.

The actuating sleeve 124 is then screwed onto the tool holder 102 until the upper end face of the outer cylinder part 128 of the actuating sleeve 124 snugly seals the upper face of the tool holder 102. This position of the actuating sleeve 124 relative to the tool holder 102 can be fixed by an appropriately dimensioned washer that is inserted into the annular T-slot 130 and with which both the base of the annular T-slot 130 and the lower end face of the tool holder 102 in FIG. 5 come into contact. When the actuating sleeve 124 is screwed onto the tool holder 102, the inner cylinder part 126 of the actuating sleeve 124 presses its end face 132 against the lower end face of the second power transmission sleeve 122 in FIG. 5. In this way, the second power transmission sleeve 122 is pushed upwards in FIG. 5. The force exerted from the inner cylinder part 126 onto the second power transmission sleeve 122 is transferred by the second power transmission sleeve 122 to the fourth tightening disc 120 and from there via the first power transmission sleeve 118 to the three tightening discs 112. The tightening discs 112 and 120 are thereby tightened, so that they become compressed around the holder of the tool insert 100, whereupon the tool insert 100 becomes firmly clamped. Care must be taken that the tool insert 100 is firmly clamped in the desired axial position. In FIG. 5, it can be seen that the upper end face of the holder of the tool insert 100 is snugly sealed with the upper aide of the tool holder 102.

The clamping power exerted by the spring action of the tightening discs 112 and 120 on the tool insert 100 depends inter alia on how far the power transmission sleeves 118 and 122 are pushed into the bore 104 of the tool holder 102. The above desired clamping power may thus be attained by appropriate dimensioning of the power transmission sleeves 118 and 122.

The tool insert 100 is released from the tool holder 102 in a simple manner, whereby the actuating sleeve 124 is unscrewed from the tool holder 102 and the tool insert 100 is pushed out of the bore 104 (upwards or downwards in FIG. 5).

The embodiment of the clamping means shown in FIG. 5 can be produced by a process which is similar to that described for FIG. 4. The tool holder 102, the contact disc 106, the tightening discs 112 and 120, the spacer sleeve 114, the power transmission sleeves 118 and 122 and the actuating sleeve 124 are produced by conventional manufacturing processes, whilst maintaining the usual tolerances of precision manufacture in a range of ±0.05 mm, and standard commercial components are used. Subsequently, the contact disc 106 in the bore 104 of the tool holder 102 is brought to its end position shown in FIG. 5, in which it is firmly connected to the tool holder 102. The three tightening discs 112, the spacer sleeve 114, the first power transmission sleeve 118, the fourth tightening disc 120 and the second power transmission sleeve 122 are then pushed from below in FIG. 5 into the bore 104 of the tool holder 102.

A washer (not illustrated in the figures), which is slightly thicker than the washer that can be used when clamping the tool insert 100, is placed in the annular T-slot 130 of the actuating sleeve 124. The actuating sleeve 124 is then screwed onto the tool holder 102 until the washer comes into contact with the lower end face of the tool holder 102 in FIG. 5. The thickness of the washer is of such a dimension that the uppermost of the three tightening discs 112 adjoins the sharp edge 110 and the fourth tightening disc 120 adjoins the sharp edge 116, and the power transmission sleeves 118 and 122 are pushed into the bore 104 to such an extent that the tightening discs 112 and 120 are preclamped according to subsequent usage so that the inner faces of the tightening discs 112 and 120 assume approximately the same position as when the tool insert 100 is clamped. In this position, final working of the tightening discs 112 and 120 takes place, whereby the inner faces thereof are ground so that the shape thereby achieved and the clamping diameter of the tightening discs 112 and 120 thereby achieved correspond to the shape and the external diameter of the holder of the tool insert 100 with high precision. The actuating sleeve 124 is then released from the tool holder 102, the washer is removed and the tightening discs 112 and 120, the spacer sleeve 114 and the two power transmission sleeves 118 and 122 are removed from the bore 104 of the tool holder 102. The individual components are then cleaned. As with the clamping means illustrated in FIGS. 2 and 3, it has been shown that with the clamping means thus produced, the tool insert 100 can be clamped into the bore 104 of the tool holder 102 with very high precision and reproducibility.

As in conjunction with the description of the manufacturing process of the clamping means described in FIGS. 2 and 3, in this manufacturing process it is also advantageous to carry out the final working of the tightening discs 112 and 120 and of the corresponding tightening discs associated with the second tool insert in one operation when the moulding tool is closed, in order to achieve good concentricity between the two tool inserts which are opposite one another when the moulding tool is closed. This final working takes place in an appropriate manner.

In a test set-up, the coaxiality and eccentricity of tool inserts which had been clamped by the clamping means illustrated in the exemplified embodiment was measured. It was shown that a centricity and coaxiality of <1.8 µm and better can be achieved. In addition, the clamping power achieved is so great that the allowable axial force of >500 N required for moulding tools for the manufacture of contact lenses can be exerted on the clamped tool insert without the tool insert shifting in an axial direction.

The moulding tool illustrated in FIG. 1 can be provided with clamping means according to one of the exemplified embodiments. In each support plate 16 and 18, there are twenty tool inserts. (When using the clamping means illustrated in FIG. 5, the second power transmission sleeve 122 corresponds to the actuating sleeve 88). Otherwise, this moulding tool it constructed in accordance with the prior art, corresponding to the described moulding tool having hydraulic clamping means, whereby in particular the movement mechanism of the moulding tool (opening up on a hinged axis) and the external dimensions of the two halves of the tool have been retained, so that the various stations of an existing production plant do not have to be changed.

Although the illustrated embodiments of the clamping means are described with reference to a 20-compartment moulding tool and a single moulding tool, they can of course be used in any moulding tool in which tool inserts are clamped into holders.

What is claimed is:

1. Clamping means for clamping a component having contact surfaces in a holder, characterised by
    (a) a recess in the holder, and
    (b) clamping means, which contain one or more spring-action clamping elements, have first and second contact surfaces and are of such a dimension that when the component to be clamped is in the clamped position, the clamping means are clamped and the first contact surfaces of the clamping means adjoin the wall of the recess and the second contact surfaces of the clamping means adjoin the contact surfaces of the component to be clamped, whereby
    (c) the shape of the second contact surfaces of the clamping means is complementary to the shape of the contact surfaces of the component to be clamped;
   wherein the clamping means contain one or more tightening discs.

2. Clamping means according to claim 1, wherein the contact surfaces of the component to be clamped or of the tool inserts to be clamped are formed by a cylindrical outer face and the second contact surfaces of the clamping means are formed by one or more annular or cylindrical inner faces which are complementary to the cylindrical outer face.

3. Clamping means according to claim 1, wherein two or more tightening discs are arranged directly next to one another.

4. Clamping means according to claim 1, wherein the tightening discs are arranged at several levels at fixed distances from one another.

5. Clamping means according to claim 1 wherein
 (a) the clamping means contain a centering sleeve and a clamping sleeve which is slidable inside the centering sleeve,
 (b) the outer face of the centering sleeve adjoins the wall of the recess,
 (c) the centering sleeve has a conical inner face, and
 (d) the clamping sleeve has a conical outer face which is complementary to the conical inner face of the centering sleeve, wherein
 (e) when the clamping sleeve is clamped, it is pushed into the centering sleeve so that the conical outer face of the clamping sleeve adjoins the conical inner face of the centering sleeve.

6. Clamping means according to claim 1 wherein the clamping means have actuating means to actuate the spring-action clamping element(s).

* * * * *